United States Patent [19]

Flytzani-Stephanopoulos et al.

[11] Patent Number: 4,977,123
[45] Date of Patent: Dec. 11, 1990

[54] PREPARATION OF EXTRUSIONS OF BULK MIXED OXIDE COMPOUNDS WITH HIGH MACROPOROSITY AND MECHANICAL STRENGTH

[75] Inventors: Maria Flytzani-Stephanopoulos, Winchester, Mass.; Kandaswami Jothimurugesan, Baton Rouge, La.

[73] Assignee: Massachusetts Institute of Technology, Cambridge, Mass.

[21] Appl. No.: 208,378

[22] Filed: Jun. 17, 1988

[51] Int. Cl.$^5$ .................... B01J 21/16; B01J 20/12; B01J 23/72; B01J 21/06

[52] U.S. Cl. ........................................ 502/84; 55/73; 423/244; 423/593; 423/594; 423/598; 423/600; 502/331; 502/343; 502/346; 502/350; 502/400; 502/406; 502/415

[58] Field of Search ................. 502/84, 400, 406, 415, 502/331, 346, 343, 350; 423/593, 594, 598, 600

[56] References Cited

U.S. PATENT DOCUMENTS

| | | | |
|---|---|---|---|
| 3,155,502 | 11/1964 | Brown | 75/214 |
| 4,207,209 | 6/1980 | Matsuda et al. | 252/462 |
| 4,313,820 | 2/1982 | Farha, Jr. et al. | 208/213 |
| 4,626,406 | 12/1986 | Poole | 419/12 |
| 4,632,683 | 12/1986 | Fukutani et al. | 55/523 |
| 4,705,767 | 11/1987 | Cheng et al. | 502/167 |
| 4,729,889 | 3/1988 | Flytzani-Stephanopoulos et al. | 423/593 |

OTHER PUBLICATIONS

Anderson, G. L. et al. (1985), "Development of a Hot Gas Cleanup System for Integrated Coal Gasification/Molten Carbonate Fuel Cell Plants", *Final Report*, DOE/MC/19403-1816.

Benbow, J. et al., *Chem. Eng. Sci.*, 42(4), pp. 753-766 (1987).

Flytzani-Stephanopoulos, M., Gavalas, G. R., Tamhankar, S. S. and Sharma, P. K. (1985) "Novel Sorbents for High-Temperature Regenerative H2S Removal," *Final Report*, DOE/MC/20417-1898.

Grindley, T. (1986), "Analysis of Fuel Gas Cleanup for Molten Carbonate Fuel Cells," in Proceed. 6th Ann. Contr. Mtg. on Contaminant Control in Coal-Derived Gas Streams, pp. 190-212, DOE/METC-86/6042.

Hammon, U. and Kotter, M. (1984), *Chem.-Ing. Tech.*, 56(6), 455-463.

Hepworth, M. et al., "Enhanced Sorbent Durability for Hot Coal-Gas Desulfurization", 6th Ann. Contr. Mtg. on Contaminant Control in Coal-Derived Gas Streams, DOE Contract No. DE-AC21-84MC 21168 (1986).

Courty, P. and Marcilly, C. (1983), "A Scientific Approach to the Preparation of Bulk Mixed Oxide Catalysts," in Preparation of Catalysts III, pp. 485-519, ed. by G. Poncelet, P. Grange and P. A. Jacobs, Elsevier, Amsterdam.

Marcilly, C., Courty, P. and Delmon, B. (1970), *J. Am. Ceram. Soc.*, 53(1), 56-57.

Tamhankar, S. S., Bagajewicz, M. J., Gavalas, G. R., Sharma, P. K. and Flytzani-Stephanopoulos, M. (1986), *Ind. Eng. Chem. Proc. Des. & Dev.*, 25, 429-437.

*Primary Examiner*—Paul E. Konopka
*Attorney, Agent, or Firm*—Thomas J. Engellenner; William C. Geary, III

[57] ABSTRACT

A simple and effective method for producing bulk single and mixed oxide absorbents and catalysts is disclosed. The method yields bulk single oxide and mixed oxide absorbent and catalyst materials which combine a high macroporosity with relatively high surface area and good mechanical strength. The materials are prepared in a pellet form using as starting compounds, calcined powders of the desired composition and physical properties these powders are crushed to broad particle size distribution, and, optionally may be combined with an inorganic clay binder. The necessary amount of water is added to form a paste which is extruded, dried and heat treated to yield and desired extrudate strength. The physical properties of the extruded materials (density, macroporosity and surface area) are substantially the same as the constituent powder is the temperature of the heat treatment of the extrudates is approximately the same as the calcination temperature of the powder. If the former is substantially higher than the latter, the surface area decreases, but the macroporosity of the extrusions remains essentially constant.

16 Claims, 1 Drawing Sheet

PREPARATION OF EXTRUSIONS OF BULK MIXED OXIDE COMPOUNDS WITH HIGH MACROPOROSITY AND MECHANICAL STRENGTH

This invention was made with the support of the U.S. Government under Contract No. DE-FC21-85MC22193, awarded by the U.S. Department of Energy. The U.S. government has certain rights in this invention.

BACKGROUND OF THE INVENTION

The present invention relates to the processing of mixed metal oxides in forms which combine high macroporosity and high mechanical strength.

It is desirable in many industrial applications, including flue gas desulfurization, coal gas or other fuel gas cleanup processes at high temperatures, as well as certain catalytic reactions such as fuel conversion and hydrodemetallation, to utilize solid absorbents or catalysts which have "open pore" structures, (i.e., a predominance of macropores). Such open pore structures present little or no resistance to gas diffusion through the pores, are less prone to pore-mouth blocking, and thereby allow better utilization of the solid For any practical application involving the use of solid-gas contactors (such as packed-bed, fluidized-bed or moving-bed reactors) the solids should be used in forms which are mechanically strong and resistant to attrition. Otherwise, the result will be a large pressure drop through the reactor, particulate matter elutriation and clogging of valves or other components of piping lines. Additionally, most reaction systems would benefit from the use of relatively high surface area solids which would enhance reaction kinetics.

Bulk mixed oxide compounds are typically prepared by the solid compounding technique. This involves several cycles of powder mixing and firing at high temperatures (usually higher than 900°–1000° C.) to effect the solid state reaction. The mixed oxide powder thus prepared is further processed conventionally by mixing with inorganic and organic additives and water followed by extrusion or pelletization, drying and heat treatment. These materials are often sintered, i.e., they consist of large grains with low surface area, and have relatively low pore volumes in order to preserve high mechanical strength. If a large amount of organic additive is used to create higher porosity during the heating step, the pore volume of the material increases, albeit at the expense of the compressive crush strength.

In the area of fuel gas cleanup at high temperatures, regenerable mixed oxide sorbents that combine relatively high surface area, high pore volume and good mechanical strength are needed to meet the requirements of cyclic high-temperature operation at high efficiency and with high sorbent utilization. Recent work in the area of hot gas cleanup has identified several regenerable mixed oxide compounds and oxide solid solutions that can effectively remove $H_2S$ in the temperature range of 1000°–1300° F. See, U.S. Pat. No. 4,729,889; Flytzani-Stephanopoulos, M. et al. (1985), "Novel Sorbent for High-Temperature Regenerative $H_2S$ Removal," Final Report DOE/MC/20417-1898; and Tamhankar S.S., et al. (1986), Ind. Eng. Chem. Pros. Des. and Dev., 25, 429–437. In that work, the sorbents (in the form of granules, $-20 +35$ mesh) were prepared with high surface area and macroporosity according to the amorphous citrate technique. These properties were shown to lead to fast absorption and regeneration rates, high sorbent utilization, and good regenerability.

Despite this work there remains a need to prepare strong absorbents and catalysts in practical forms, i.e., greater than 1-2 mm size, which have desired levels of macroporosity and surface area. Accordingly, it is an object of the invention to provide a method of preparing metal oxide and mixed metal oxide catalysts and absorbents which combine desired levels of surface area with high macroporosity and high mechanical strength It is also an object of the invention to provide a more simplified method of preparing such catalysts and absorbents while controlling the physical properties of these materials. Another object of the invention is to provide strong, macroporous extruded single oxide and mixed oxide compositions which are useful as absorbents and catalysts. Other objects of the invention will become apparent to those skilled in the art upon reading the present disclosure.

SUMMARY OF THE INVENTION

According to the invention a method is provided for preparing compositions comprised of bulk single oxides and mixed oxide compounds which have a desired degree of macroporosity combined with high mechanical strength. The method involves preparing such compositions by extruding and processing precursor metal oxide and mixed oxide powders such that the resulting extruded shapes (forms) have surface area, macroporosity and density properties which are similar to those of the constituent powders. The invention thus provides simplified techniques for preparing bulk single or mixed oxide compounds, and easily controlling the physical properties of such compounds to provide materials suitable for a given application. The compositions prepared by this method are, for example, useful as sorbents for hot gas cleanup catalysts for fuel conversion reactions, sorbent-catalysts for combined $SO_x/NO_x$ removal from combustion gases and similar processes.

According to the invention, the extruded oxide compositions are derived from macroporous single oxide and mixed oxide powders having a high surface area and a wide particle size distribution with both coarse (60–250 $\mu$m) and fine (less than 60 $\mu$m) particles. The constituent powders may be oxides and oxide mixtures of various metals such as, for example, copper, iron, aluminum, zinc, titanium, and mixtures thereof An inorganic binder material, such as bentonite clay or another inorganic clay, may be added to the powders in an amount ranging between 2–7% by weight. As noted above, it has been found that the properties of the constituent powders largely determine the properties of the extruded solid composition. That is, the extruded solids will feature substantially the same surface area, macroporosity and density properties as their constituent powders. However, the extruded compositions do exhibit a small decrease in pore size over the powders (due to a loss of pores in the higher than 25 $\mu$m range), and a small increase in bulk density. The extruded solids, of course, also feature the additional benefit of a reasonably high compressive crush strength which ranges between 1 and 10 lbs/mm of extrusion length. The similarity of properties of the resulting compositions and their constituent powders contributes to the relative ease of preparing materials with properties suited to a given application.

The constituent powders, as will be further explained herein, can be synthesized from amorphous citrate precursors, using a known complexation technique. Following their preparation and vacuum dehydration, the amorphous organic precursors are pyrolyzed and calcined to form highly dispersed bulk mixed oxide compounds or oxide solid solutions. Calcination is typically carried out at lower temperatures (i.e., 500°-850° C.) and for shorter times than in the solid compounding technique. The powders are then crushed and powders with a broad particle size distribution are utilized for preparing the extruded composition. At this stage, if necessary, a binder material comprising an inorganic clay may be added in an amount ranging from 2-7 wt. %. The powders are then formed into a paste by adding a suitable amount of deionized water, and the paste is subsequently extruded through a die. The extrudate strands are then cut or otherwise processed to a desired size and shape, and are dried and heat treated.

Although the method of the present invention is applicable to the processing of virtually any oxide or mixture of oxides of the elements, such as the transition metals, alkali metals, alkaline earth and the rare earth elements, the invention is described with respect to certain metal oxides due to the usefulness of these materials as catalysts and absorbents in hot fuel gas cleaning operations. One such preferred exemplary composition is a mixture of copper, iron and aluminum oxides Other preferred exemplary compositions include the binary oxides of copper and aluminum, and zinc and titanium. Pure (bulk) metal oxides, such as ZnO, CuO, and the like may also be prepared according to this invention.

The extruded sorbents of this invention may be used in a variety of applications, including use as catalysts and absorbents. These compositions, for example, may be formed into cylindrical extrudates, tablets or spherical pellets ranging in diameter about 1/16 to ⅜ inch which may be used as catalysts or regenerable absorbents in fluidized-bed, moving-bed or fixed-bed reactors for fuel or combustion gas purification. The extruded compositions may also be formed into shapes desired for specialized applications such as structural membranes for gas separations, filtering of particulates, or multifunctional gas cleanup, such as in combined chemical and physical cleanup of fuel and combustion gas streams.

BRIEF DESCRIPTION OF THE DRAWING

The drawing is a flow chart illustrating the method of the present invention.

DETAILED DESCRIPTION OF THE INVENTION

Figure 1:
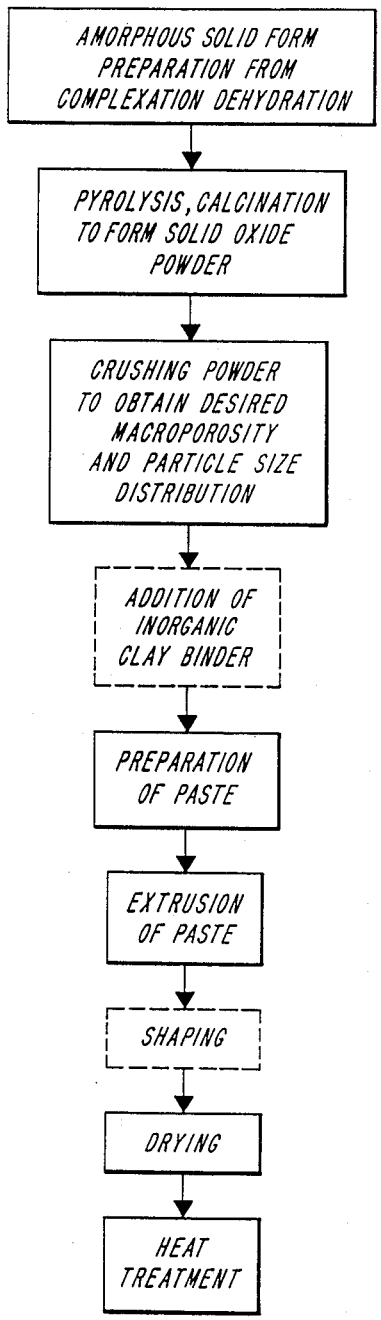

The process for preparing the bulk oxide compositions of the present invention is illustrated in the flow chart of the drawing As shown in the drawing, a complexation technique is used to prepare oxide powders which serve as the precursors to the extruded compositions prepared by the method of this invention. The single or mixed oxide compound powders are prepared in highly dispersed form by pyrolysis-calcination of amorphous citrate precursors at an appropriate temperature between 550° and 850° C. The powder is then crushed to yield a material having a desired macroporosity and particle size distribution. An extrudable paste is then prepared from the powder by adding a suitable amount of deionized water. The paste is then extruded and cut or otherwise processed to a desired size and shape. Following extrusion, the material is dried and heat treated at a temperature between 600°-850° C. (or a temperature at which the material is expected to be used) for 2-6 hours to yield an extruded bulk oxide or mixed oxide compound having desired macroporosity, surface area and density, in addition to good mechanical strength.

The method of this invention yields extruded compositions which advantageously combine high macroporosity and good mechanical strength. The combination of these properties, together with a relatively high surface area, renders the compositions useful as absorbents and catalysts As used herein, the term "macroporosity" refers to the property of a material having at least 60 percent of its pores in the size range of 0.1 to 25.0 $\mu$m diameter.

The process of this invention simplifies and provides better control of processing of solid oxide absorbent and catalyst materials. As previously noted, the extruded bulk oxide compounds retain several important properties of their constituent powders. The preparation of these compositions, with properties necessary for a desired application, is thus simplified and easier to control as the powders may be prepared so as to have substantially the properties which are desired in the final composition. In addition, this method enables mechanical strength to be imparted and retained in the extruded compositions as organic macropore formers need not be added to achieve the desired macroporosity. Indeed, the addition of organic macropore formers, such as formic acid, aluminum formate, methylcellulose and hydroxy-ethylcellulose, has been found to significantly decrease the strength of the resulting materials.

The properties desired in the extruded compositions formed by the method of this invention include the combination of intermediate surface area 5-35 $m^2/g$), high porosity (60-80%) and large pore volume ($\geq 0.4 cm^3/g$) with a major fraction of the pore volume in pores of 0.1-25.0 $\mu$m in diameter. Of course, the extruded compositions of this invention also exhibit good mechanical strength with a compressive crush strength ranging between 1.0 to 15.0 lb/mm of extrusion length and more preferably between 3-10 lb/mm. Generally, CuO-based extruded materials, stabilized with $Al_2O_3$ can be used, for example, in high performance, regenerative desulfurization of coal gases at temperatures up to 800° C. $ZnO-TiO_2$ materials show high $H_2S$ removal efficiency and stabilize ZnO against reduction at 650° C. when used in hot gas cleaning applications. The composition prepared by the method of this invention which exhibits the best properties for hot gas cleaning applications is nominally: $3CuO:Fe_2O_3:Al_2O_3$. This material combines high $H_2S$ removal efficiency, high sulfur loading (about 20 weight percent), good structural properties, regenerability in cyclic operation and high selectivity towards elemental sulfur formation in regeneration with $H_2O$-rich air streams.

The constituent powders can be first synthesized from amorphous citrate precursors, which carry the metals in desired proportions, using a known complexation technique. Such a complexation technique is disclosed in Marcilly, C., et al., "Preparation of Highly Dispersed Mixed Oxides and Oxide Solid Solutions by Pyrolysis of Amorphous Organic Precursors", *J. Amer. Chem. Soc.—Discussions and Notes*, Vol. 53, No. 1, pp. 56-57 (1970), which is hereby incorporated by reference. Briefly, the technique involves preparing a solution of the desired metal salts and citric acid in deionized water; dehydrating the solution in a rotary evaporator; transferring partially dehydrated liquid to a vacuum oven where dehydration is completed; and transferring the resulting solid foam to a muffle furnace for pyrolysis-calcination in air at 550°–850° C. for 4–8 hours. Following pyrolysis-calcination, the solids are crushed and sieved. Powders displaying macroporosity and a broad particle size distribution (less than 210 $\mu$m) are further processed to yield high strength, extruded bulk oxide compositions.

The powders useful in practicing the process of this invention preferably are powders with a particle size distribution as shown below in Table I. The combination of coarse particles and fine particles is deemed important in the process of this invention as the fine particles pack closely into the voids formed between the larger particles, thereby yielding good compaction and mechanical strength.

TABLE I

| Percent of Particles | Size Range ($\mu$m) |
|---|---|
| 10–35 | 125–210 |
| 10–35 | 90–124 |
| 5–20 | 75–89 |
| 5–15 | 63–74 |
| 25–50 | <63 |

The constituent powders prepared by the amorphous citrate technique are further processed to form the extruded bulk oxide compositions as follows. The constituent bulk oxide powder, prepared in the manner noted above, may be combined with an inorganic binder material such as bentonite clay or other inorganic clays. Preferably the clay is added in an amount ranging from 2–7% of the composition by weight. Pastes are then prepared by adding to the powder and binder mixtures the necessary amount of deionized water, typically 50–75 cm$^3$ of water per 100g of solid powder. The pastes may be extruded using an extruder equipped with a die having a plurality of holes An example of an extruder useful with this invention is a Wahlco, hydraulic piston-driven model 20-8 laboratory-scale extruder equipped with a 2 inch die having 17 holes, each of a ⅛ inch diameter. The extrusion process yields moist cylindrical strands which may be shaped to a desired size and configuration. These strands may simply be cut to several centimeters in length and dried in an oven at 110°–120° C. for approximately 16 hours under air flow and subsequently cut to about ¼"–⅜" in length. Alternatively, the strands may be processed in a pelletizer to yield pellets of a variety of sizes and shapes. The dried pellets may subsequently be heat treated in air in a muffle furnace at approximately 650°–850° C. for five hours. These materials may then be deployed as catalysts and absorbents for hot gas cleaning operations, or in other suitable applications.

The temperature at which the pelletized, extruded materials are heat treated depends upon the desired use of the compositions. As demonstrated below in Table II, the treating of Cu-Fe-Al-O materials at 650° C. yields a material having a lower strength than one which is indurated at 850° C. However, a much greater surface area is obtained when the material is treated at the lower temperature. In general, higher temperatures result in a material which is stronger, but one which has a substantially reduced surface area As demonstrated below in Table IV, application of Cu-Fe-Al-O materials to desulfurization of hot coal gases places a low demand on the surface area of the sorbent due to redispersion that takes place during sulfidation. Hence, in this case the stronger material (heat treated at 850° C.) is preferred. The important feature, for any heat treatment of the extruded materials according to this invention, is that the macroporosity of the extrusions remains essentially the same. This is believed to be a direct consequence of the fact that macropores (>0.1 $\mu$m in diameter) do not sinter.

The extruded compositions which may be prepared by the method of this invention include oxides of virtually any transition metal, alkali metal, alkaline earth element or rare earth element, and mixtures thereof. Exemplary compounds, and compounds which are particularly useful in hot fuel gas cleanup are oxides of aluminum, titanium, iron, copper and zinc. These compounds may be combined to form ternary and binary oxides of the metals, and may also be prepared as pure (i.e., single element) metal oxides. Presently, the most preferred sorbent compositions which may be prepared include ternary oxides of copper, iron and aluminum (Cu-Fe-Al-O); binary oxides of copper and aluminum (Cu-Al-O), and zinc and titanium (Zn-Ti-O); and pure (bulk) oxides, such as zinc oxide (ZnO) or copper oxide (CuO). Other compounds such as a ternary oxide of zinc, iron and titanium (Zn-Fe-Ti-O) may also be prepared.

The Cu-Fe-Al-O extruded compositions may be prepared in a variety of metal ratios. However, very high levels of copper or iron oxide in a sorbent, for example, generally result in less efficient H$_2$S removal while higher levels of aluminum oxide reduce the overall sulfur capacity of the sorbent. The Cu-Fe-Al-O extruded nominal/compositions (i.e., xCuO:yFe$_2$O$_3$:zAl$_2$O$_3$) which are believed to have the most balanced properties and thus the most desirable performance characteristics, when used as a sulfur sorbent, are presently believed to be compositions wherein 1–5 copper atoms are present, 0–6 iron atoms are present and 2–6 aluminum atoms are present. Currently, the most preferred compositions which may be prepared by this method are 3CuO:Fe$_2$O$_3$:Al$_2$O$_3$ and CuO:Fe$_2$O$_3$:Al$_2$O$_3$.

Likewise, binary oxides of copper and aluminum may be prepared in various metal ratios currently preferred, and easily prepared binary oxide is xCuO:yAl$_2$O$_3$, where x is 1–3 and y is 1–4. As noted above, a pure copper oxide composition (CuO) may also be prepared by the method of this invention.

Zinc oxide-based sorbents may be prepared as binary oxides of zinc and titanium with various Zn:Ti ratios. Examples of such zinc-based, binary metal oxide compounds which may be prepared according to this invention are those wherein 0 4–2 zinc atoms are present with 0.4–2 titanium atoms. A preferred zinc oxide-based sorbent is one prepared in the presence of chloride ion, e.g. using TiCl$_4$ in place of the usual Ti-isopropoxide in the precursor solution. A preferred zinc-based binary oxide which may be prepared according to this invention is 0.5–1.5 ZnO:TiO$_2$.

As noted above, the constituent powders largely determine the properties of the final extruded sorbent Tables II and III, shown below, demonstrate the similarity of the properties for several compositions prepared according to the method of this invention, compared to their constituent powders.

TABLE II

Physical Properties of 3CuO:Fe$_2$O$_3$:Al$_2$O$_3$ Materials

| Material | Calcination T* (°C.) | Compressive Crush Strength (lb/mmm) | Pore Vol. (cc/g) | BET Surface Area (M$^2$/g) | Bulk Density (g/cc) | Porosity # (%) | >25 | 25-1 | 1-.01 (μm) | 0.1-0.003 |
|---|---|---|---|---|---|---|---|---|---|---|
| Rough Formulation (420-841 μm) | 650 | NA | 1.26 | 12.71 | 0.64 | 80 | 37.1 | 30.0 | 18.9 | 14.0 |
| Powder (<210 μm) | 650 | NA | 0.74 | 12.8 | 1.10 | 81 | 7.7 | 48.0 | 24.3 | 20.0 |
| Extruded Composition** (⅛" pellets) | 650 | 0.98; 1.03 | 0.47 | 12.98 | 1.30 | 75 | 6.0 | 32.6 | 41.4 | 20.0 |
| Extruded Composition** (⅛" pellets) | 850 | 4.81; 3.65 | 0.42 | 3.53 | 1.49 | 63 | 6.0 | 48.3 | 34.3 | 11.4 |

*Calcined for 5 hours
**Extruded with approx. 5 wt. % bentonite clay
All values are estimated from mercury porosimetry analysis

TABLE III

| Material | Calcination T* (°C.) | Compressive Crush Strength (lb/mm) | Pore Vol. (cc/g) | BET Surface Area (m$^2$/g) | Bulk Density (g/cc) | Porosity # (%) | >25 | 25-1 | 1-.01 (μm) | 0.1-0.003 |
|---|---|---|---|---|---|---|---|---|---|---|
| CA Rough Formulation (420-841 μm) | 700 | NA | 1.41 | 35.3 | 0.58 | 83 | 44.3 | 37.1 | 10.0 | 8.6 |
| CA Powder (<210 μm) | 700 | NA | 0.74 | 35.3 | 1.03 | 76 | 2.1 | 62.8 | 18.0 | 17.1 |
| Extruded CA Composition** (⅛" pellets) | 700 | 0.56; 0.78 | 0.44 | 32.8 | 1.22 | 54 | 1.5 | 48.5 | 37.1 | 12.9 |
| Extruded CA Composition** (⅛" pellets) | 850 | 0.8; 1.23 | 0.49 | 14.8 | 1.38 | 69 | 0.0 | 40.0 | 40.0 | 20.0 |
| ZT Rough Formulation (420-841 μm) | 700 | NA | 1.84 | 5.3 | 0.52 | 95 | 32.9 | 32.8 | 20.0 | 14.3 |
| ZT Powder (<210 μm) | 700 | NA | 0.56 | 5.4 | 1.30 | 73 | 6.5 | 31.6 | 46.3 | 15.6 |
| Extruded ZT Composition** (⅛" pellets) | 700 | 1.44 | 0.51 | 6.3 | 1.35 | 69 | 0.0 | 45.7 | 32.9 | 21.4 |

*Calcined for 5 hours
**Extruded with approx. 5 wt. % bentonite clay.
All values estimated from mercury porosimetry.
NA = not available Table IV, shown below, illustrates the physical properties of mixed metal oxide compositions prepared according to the present invention, when utilized as H$_2$S sorbents in hot gas desulfurization applications. This table provides a comparison of certain physical properties of the materials depicted in Tables II and III, as fresh H$_2$S sorbents, sulfided sorbents and regenerated sorbents.

TABLE IV

Physical Properties of Fresh and Used Mixed Metal Oxide Sorbents*

| Sorbent | State | Compressive Crush Str. (lb/mm) | Pure Vol. (cc/g) | BET Surf. Areas (m$^2$/g) | Bulk Density (g/cc) | Porosity (%) | >25 | 25-1 | 1-0.1 (μm) | 0.1-0.003 |
|---|---|---|---|---|---|---|---|---|---|---|
| Cu-Fe-Al-O | Fresh, 650° C. | 0.98; 1.03 | 0.47 | 12.98 | 1.30 | 77 | 6.0 | 32.6 | 41.4 | 20.0 |
| | Sulfided, 650° C. | 0.85; 1.73 | 0.37 | 10.82 | 1.41 | 52 | 3.0 | 39.9 | 42.8 | 14.3 |
| | Regenerated, 650° C. | 0.78 | 0.54 | 9.89 | 1.48 | 78 | 1.5 | 7.6 | 89.5 | 1.4 |
| Cu-Fe-Al-O | Fresh, 850° C. | 4.81; 3.65 | 0.42 | 3.53 | 1.49 | 63 | 6.0 | 48.3 | 34.3 | 11.4 |
| | Sulfided, 650° C. | 0.98; 1.62 | 0.37 | 10.24 | 1.52 | 56 | 3.0 | 44.1 | 45.8 | 7.1 |
| | Regenerated, 650° C. | 2.59; 2.64 | 0.39 | 7.09 | 1.54 | 60 | 3.0 | 41.3 | 45.7 | 10.0 |
| Cu-Al-O | Fresh, 850° C. | 0.8; 1.23 | 0.49 | 14.77 | 1.38 | 70 | 0.0 | 40.0 | 40.0 | 20.0 |
| | Sulfided, 650° C. | 0.37 | 0.42 | 24.30 | 1.37 | 58 | 3.0 | 49.9 | 37.1 | 10.0 |
| | Regenerated, 700° C. | 0.44 | 0.47 | 6.39 | 1.23 | 58 | 1.5 | 49.9 | 37.2 | 11.4 |
| Zn-Ti-O | Fresh, 700° C. | 1.44 | 0.51 | 6.30 | 1.35 | 72 | 0.0 | 45.7 | 32.9 | 21.4 |
| | Sulfided, 650° C. | 2.12 | 0.94 | 7.09 | 0.74 | 69 | 1.5 | 44.2 | 28.6 | 25.7 |
| | Regenerated, 700° C. | 1.62 | 0.27 | 5.41 | 2.23 | 60 | 1.5 | 45.6 | 32.9 | 20.0 |

*⅛" Diameter × ~¼" long cylindrical extrusions.

X-ray diffraction analysis of fresh, sulfided and regenerated 3CuO:Fe$_2$O$_3$:Al$_2$O$_3$; CuO:Al$_2$O$_3$; and 0.4ZnO:TiO$_2$ sorbent extrusions prepared according to this invention was conducted to determine the crystallinity and the crystalline phases constituting each material. Fresh 3CuO:Fe$_2$O$_3$:Al$_2$O$_3$ sorbent (heat treated at 650° C.) exhibited 100% crystallinity with approximately 9.3 wt.% elemental copper, 22.3 wt.% CuO, 16.6 wt.% CuAl$_2$O$_4$, and 51.8 wt.% CuFe$_2$O$_4$. The same material, after sulfidation at 650° C., exhibited 70-80% crystallinity with 11.3 wt.% element copper, 22.8 wt.% CuAl$_2$O$_4$, 9.3 wt.% CuFe$_2$O$_4$, 6.7 wt.% Cu$_2$S 49.9 wt.% Cu$_5$FeS$_4$. Upon 650° C. regeneration, this material had 85-95% crystallinity and comprised 11 wt.% elemental copper, 30.0 wt.% CuO, 23.0 wt.% CuAl$_2$O$_4$, and 36.0 wt.% CuFe$_2$O$_4$.

The CuO:Al$_2$O$_3$ fresh sorbent material (heat treated at 850° C.) possessed about 90% crystallinity with 15.0 wt.% CuO and 85.0 wt.% CuAl$_2$O$_4$. Crystallinity decreased to 75-85% when sulfided (at 650° C.), and the sulfided sorbent comprised 18 wt.% elemental copper, 60 wt.% CuAl$_2$O$_4$, 15 wt.% Cu$_{1.93}$S and 7 wt.% δ-Al$_2$O$_3$. Regeneration at 700° C. increased crystallinity of this material to 90-100%, and upon regeneration it comprised 11 wt.% Cu and 89 wt.% CuAl$_2$O$_4$.

A fresh 0.4ZnO:TiO$_2$ sorbent (heat treated at 700° C.) had 100% crystallinity as a fresh sorbent, as sulfided sorbent (at 650° C.) and as a regenerated (700° C.) sorbent. The fresh sorbent comprised 61 wt.% ZnTiO$_3$ and 39 wt.% TiO$_2$. The composition of the sulfided compound was 26.6 wt.% β-ZnS, 13.8 wt.% α-ZnS and 59.6 wt.% TiO$_2$. The regenerated sorbent comprised 51.8 wt.% ZnTiO$_3$ and 48.2 wt.% TiO$_2$. In all cases, the utile phase of TiO$_2$ was identified.

The following examples further illustrate the preparation of the extruded sorbents of the present invention.

EXAMPLE 1

Cu-Fe-Al-O

An extruded mixed oxide composition of 3CuO:Fe$_2$O$_3$:Al$_2$O$_3$ was prepared by a complexation technique as described above. The precursors used in preparing the solution of metal salts and citric acid for this material were Cu(NO$_3$)$_2$·2.5 H$_2$O; Fe(NO$_3$)$_3$·9 H$_2$O; Al(NO$_3$)$_3$·9 H$_2$O; and HOCCOOH(CH$_2$COOH)$_2$·H$_2$O. This solution was dehydrated in a rotary evaporator at 65°-75° C. under vacuum (26–29 inches Hg) for 10–20 minutes. The partially dehydrated liquid was then transferred to a vacuum oven where it was dried at a pressure of 29 inches Hg at 70° C. for 8–24 hours. The resulting foam was transferred to a muffle furnace for fast pyrolysis at 425° C. for 15 minutes, followed by air calcination at 650° C. for 5 hours. The calcined solids were crushed and sieved to less than 210 μm sized powder. This powder was thoroughly mixed with approximately 5 wt.% bentonite clay powder. A paste was prepared by adding approximately 0.6g deionized H$_2$O per gram of powder. The paste was extruded using a Wahlco model 20-8 laboratory scale extruder having a two inch diameter die with 17 holes each having a ⅛" diameter. The extrudate was then cut into pellets of about ⅛" in length. These pellets were dried at 110° C. for 16 hours in an oven in slowly flowing air. A portion of the dried pellets was then heat treated at 650° C. for 5 hours, while another portion was heat treated at 850° C. for 5 hours. The properties of these materials are illustrated in Table II

EXAMPLE 2

Cu-Al-O

An extruded composition of CuO:Al$_2$O$_3$ was prepared by a complexation technique as generally described above. The precursors used in preparing the metal salt and citric acid solution were Cu(NO$_3$)$_2$·2.5 H$_2$O; Al(NO$_3$)$_3$·9 H$_2$O; and HOCCOOH(CH$_2$COOH)$_2$·H$_2$O. This solution was dehydrated in a rotary evaporator at 65°-75° C. under vacuum (26–29 inches Hg) for 10–20 minutes. The partially dehydrated liquid was then transferred to a vacuum oven where it was dried at a pressure of 29 inches Hg at 70° C. for 8 hours. The resulting foam was transferred to a muffle furnace for fast pyrolysis at 425° C. for 15 minutes, followed by air calcination at 700° C. for 5 hours. The calcined solids were crushed and sieved to less than 210 μm sized powder. This powder was thoroughly mixed with approximately 5 wt.% bentonite clay powder. A paste was prepared by adding approximately 0.6 g deionized H$_2$O per gram of powder. The paste was extruded using a Whalco model 20-8 laboratory extruder having a two inch diameter die with 17 holes, each having a diameter of ⅛". The extrudate was then cut into pellets of about ⅛" in length. These pellets were dried in an oven with slowly flowing air at 120° C. for 16 hours. A portion of the dried pellets was then heat treated at 700° C. for 5 hours, while another portion was heat treated at 850° C. for 5 hours. The properties of these materials are illustrated in Table III.

EXAMPLE 3

Zn-Ti-O

An extruded composition of 0.4ZnO:TiO$_2$ was prepared by a complexation technique as generally described above. The metal salt and citric acid solution was formed using as precursors, Zn(C$_2$H$_3$O$_2$)$_2$·2 H$_2$O; TiCl$_4$; and HOCCOOH(CH$_2$COOH)$_2$·H$_2$O. This solution was prepared in a dry box under nitrogen flow due to the extreme air sensitivity of TiCl$_4$. This solution was dehydrated in a rotary evaporator at 65°-75° C. under vacuum (26–29 inches Hg) for 10–20 minutes. The partially dehydrated liquid was transferred to a vacuum oven where it was dried at a pressure of 29 inches Hg at 70° C. for approximately 8 hours. The resulting foam was transferred to a muffle furnace for fast pyrolysis at 425° C. for 15 minutes, followed by air calcination at 700° C. for 5 hours. The calcined solids were crushed and sieved to less than 210 μm sized powder. This powder was thoroughly mixed with approximately 5 wt.% bentonite clay powder. A paste was prepared by adding approximately 0 45 g deionized H$_2$O per gram of powder. The paste was extruded using a Wahlco model 20-8 laboratory scale extruder having a two inch diameter die with 17 holes of ⅛ inch in diameter. The extrudate was then cut into pellets of about ⅛" in length. These pellets were dried at 110° C. for 16 hours in an oven in slowly flowing air. The dried pellets were then heat treated at 700° C. for 5 hours in a muffle furnace. The properties of these materials are illustrated in Table III.

What is claimed is:

1. A method of preparing bodies of bulk metal oxide-based solid catalysts and absorbents having controllable surface area greater than 5 m$^2$/g, macroporosity, high pore volume and, comprising the steps of:

a compressive crush strength in the range of approximately 1–10 lb/mm.;

preparing a citrate precursor having, in desired proportions, metals selected from the group consisting of aluminum, zinc, transition metals, alkali metals, alkaline earth elements, rare earth elements and mixtures thereof;

calcining the citrate precursor at a temperature ranging between 550° C.–850° C. for approximately 4–8 hours to yield a highly dispersed and macroporous metal oxide solid;

treating the metal oxide solid by crushing and sizing to yield a highly dispersed, macroporous powder having a continuous particle size distribution such that fine and coarse size particles are retained, and macropores, in the size range of 0.1 μm to 25 μm in diameter, comprise a least 60% of the total pore volume of the powder and the remaining pores have a diameter less than 0.1 μm;

adding about 2–7 percent by weight of a clay binder material to the powder;

forming solid bodies from the powder;

shaping the bodies to an appropriate size and shape;

drying the bodies in air at 100° C.–120° C. for approximately 16 hours; and heat treating the bodies for approximately 2-6 hours at a temperature in the range of approximately 650° C.-850° C.

2. The method of claim 1 wherein the metal oxide powder has a particle size distribution such that approximately 10 to 35% of the particles have a size ranging from 125-210 $\mu$m, 10-35% of the particles have a size ranging from 90-124 $\mu$m, 5-20% of the particles have a size ranging from 75-89 $\mu$m, 5-15% of the particles have a size ranging from 63-74 $\mu$m and 25-50% of the particles are of a size less than 63 $\mu$m.

3. The method of claim 1 wherein said clay binder material is bentonite.

4. The method of claim 2 wherein the metal oxide powder is formed from a metal selected from the group consisting essentially of copper, iron, aluminum, zinc, titanium and mixtures thereof.

5. The method of claim 4 wherein the metal oxide powder is selected from the group consisting of oxide compounds of copper, iron, aluminum and mixtures thereof.

6. The method of claim 5 wherein the atomic ration of the metals is xCu:yFe;zAl, wherein x is between 1 and 5, y is between 0 and 6, and z is between 0.5 and 6.

7. The method of claim 4 wherein the metal oxide powder is selected from the group consisting of oxide compounds of copper, aluminum and mixtures thereof.

8. The method of claim 7, wherein the atomic ratio of the metals is xCu:yAl wherein x and y are each between 1 and 3.

9. The method of claim 4 wherein the metal oxide powder is selected from the group consisting of oxides of zinc, titanium and mixtures thereof.

10. The method of claim 9 wherein the atomic ratio of the metals is xZn:yTi wherein x is 0.4-2 and y is 0-2.

11. The product produced by the method of claim 1.

12. The product of claim 11, wherein the product is an active sorbent catalyst for gas cleanup.

13. The product of claim 11, wherein the product is a regenerable hot gas desulfurization sorbent.

14. An extruded sorbent composition comprising mixed oxide compounds of xCuO, yFe$_2$O$_3$ and zAl$_2$O$_3$, wherein x is 1-5, y is 0-6 and z is 1-6, and 2-7 percent by weight of a clay binder material, said extruded sorbent having a high degree or porosity ranging between 60 and 85%, such that at least 60 percent of the pores have a diameter ranging from approximately 0.1 to 25.0 $\mu$m, the remaining pores have a diameter less than 0.1 $\mu$m and wherein said extruded sorbent composition has a surface area greater than about 5 m$^2$/g and a compressive crush strength in the range of approximately 1-10 lb/mm.

15. An extruded sorbent composition comprising mixed oxide compounds of xCuO and yAl$_2$O$_3$, wherein x and y are between 1 and 3, and 2-7 percent by weight of a clay binder material, said extruded sorbent having a high degree of porosity, ranging between 60% and 85%, such that at least 60% of the pores have a diameter ranging from approximately 0.1 $\mu$m to 25.0 $\mu$m, the remaining pores have a diameter less than 0.1 $\mu$m and wherein said extruded sorbent composition has a surface area greater than 5 m$^2$/g and a compressive crush strength in the range of approximately 1-10 lb/mm.

16. An extruded sorbent composition comprising mixed oxide compounds of xZnO and yTiO$_2$, wherein x is 0.4-2 and y is 0-2, and about 2-7 percent by weight of a clay binder material, said extruded sorbent having a high degree of porosity, ranging between 60 and 85%, such that at least 60 percent of the pores have a diameter ranging from approximately 0.1 to 25 $\mu$m, the remaining 40% of the pores have a diameter less than 0.1 $\mu$m, and wherein said extruded sorbent composition has a surface area greater than 5 m$^2$/g and a compressive crush strength in the range of approximately 1-10 lb/mm.

* * * * *